(12) United States Patent
Tulloch et al.

(10) Patent No.: US 11,332,231 B2
(45) Date of Patent: May 17, 2022

(54) HOLLOW FASTENER FOR COUPLING AEROSPACE STRUCTURES

(71) Applicant: Airbus Operations Limited, Bristol (GB)

(72) Inventors: William Tulloch, Bristol (GB); Pat Broomfield, Bristol (GB)

(73) Assignee: Airbus Operations Limited, Bristol (GB)

( * ) Notice: Subject to any disclaimer, the term of this patent is extended or adjusted under 35 U.S.C. 154(b) by 627 days.

(21) Appl. No.: 16/201,419

(22) Filed: Nov. 27, 2018

(65) Prior Publication Data

US 2019/0161160 A1 May 30, 2019

(30) Foreign Application Priority Data

Nov. 28, 2017 (GB) ...................................... 1719740

(51) Int. Cl.
*B64D 27/12* (2006.01)
*B64C 3/32* (2006.01)
(Continued)

(52) U.S. Cl.
CPC ................ *B64C 3/32* (2013.01); *B64D 27/12* (2013.01); *B64D 27/26* (2013.01); *F16B 5/02* (2013.01);
(Continued)

(58) Field of Classification Search
CPC .. B64C 3/185; B64C 3/32; B64C 3/34; B64D 27/12; B64D 27/26; B64D 2027/264;
(Continued)

(56) References Cited

U.S. PATENT DOCUMENTS 2,700,172 A * 1/1955 Rohe ....................... F16B 43/00
16/2.1
2,957,196 A * 10/1960 Delgadillo ................ F16B 5/01
16/2.1
(Continued)

FOREIGN PATENT DOCUMENTS

DE       19613212 A1 *  10/1997    ................ F16F 1/38
DE    102012009173       11/2012
(Continued)

OTHER PUBLICATIONS

Combined Search and Exam Report for GB 1719740.1, dated Feb. 27, 2018, 5 pages.
(Continued)

*Primary Examiner* — Richard R. Green
*Assistant Examiner* — Michael A. Fabula
(74) *Attorney, Agent, or Firm* — Nixon & Vanderhye P.C.

(57) ABSTRACT

A fastener for holding together two or more structures. The fastener includes a first bush and a second bush. The first bush includes a hollow shaft having a first end and a second end opposite to the first end. The first end of the first bush has a first radially-extending protrusion. The second bush includes a hollow shaft having a first end and a second end opposite to the first end. The first end of the second bush has a second radially-extending protrusion. The second end of the second bush is configured to connect to the second end of the first bush so as to resist separation of the first and second bushes and so as to define an axial hole through the fastener defined by the shaft of the first bush and the shaft of the second bush.

13 Claims, 6 Drawing Sheets

(51) Int. Cl.
*F16B 5/02* (2006.01)
*F16C 17/12* (2006.01)
*B64D 27/26* (2006.01)
*F16B 19/02* (2006.01)

(52) U.S. Cl.
CPC .............. *F16B 19/02* (2013.01); *F16C 17/12* (2013.01); *B64D 2027/264* (2013.01)

(58) Field of Classification Search
CPC . B64D 37/02; B64D 37/06; F16B 5/01; F16B 5/02; F16B 5/04; F16B 19/02; F16C 17/12
See application file for complete search history.

(56) References Cited

U.S. PATENT DOCUMENTS

| | | | | |
|---|---|---|---|---|
| 3,771,410 A * | 11/1973 | Swindt, II | ................. | F16B 5/01 411/338 |
| 4,934,861 A * | 6/1990 | Weeks | ................... | B62D 21/09 403/167 |
| 4,981,735 A * | 1/1991 | Rickson | .................... | F16B 5/01 156/92 |
| 5,093,957 A * | 3/1992 | Do | .......................... | E04C 2/365 16/2.1 |
| 5,542,777 A * | 8/1996 | Johnson | ............... | B61D 17/043 403/384 |
| 5,797,697 A * | 8/1998 | Keller | .................. | F16B 7/0493 248/74.1 |
| 6,488,460 B1 * | 12/2002 | Smith | ...................... | F16B 5/01 411/339 |
| 6,930,248 B1 * | 8/2005 | Saka | ...................... | H02G 3/086 174/50 |
| 8,596,603 B2 * | 12/2013 | Gallet | ....................... | F02C 7/20 248/610 |
| 10,309,434 B2 * | 6/2019 | Kleshchev | ................ | F02K 1/54 |
| 2004/0111864 A1 * | 6/2004 | Skinner | ................... | B23P 9/025 29/523 |
| 2013/0175773 A1 | 7/2013 | Sherley et al. | | |
| 2014/0157782 A1 * | 6/2014 | Kramer | ..................... | F23R 3/60 60/752 |
| 2018/0216644 A1 * | 8/2018 | Mateo | ....................... | F16B 5/04 |
| 2018/0340571 A1 * | 11/2018 | Ayyagari | .............. | F16C 23/045 |

FOREIGN PATENT DOCUMENTS

| | | |
|---|---|---|
| EP | 3241739 | 11/2017 |
| FR | 2956706 | 8/2011 |
| GB | 861884 | 3/1961 |
| GB | 2 017 857 | 10/1979 |

OTHER PUBLICATIONS

European Search Report cited in EP 18208307.1 dated Jul. 15, 2019, 9 pages.
European Search Report cited in EP 18 208 307.1 dated Oct. 28, 2021, 5 pages.

* cited by examiner

HOLLOW FASTENER FOR COUPLING AEROSPACE STRUCTURES

RELATED APPLICATION

This application claims priority to United Kingdom Patent Application GB 1719740.1, filed 28 Nov. 2017, the entirety of which is incorporated by reference.

TECHNICAL FIELD

The present invention relates to a fastener for holding together two or more structures, and also to an assembly comprising a first structure and a second structure held together by a fastener.

BACKGROUND

Most conventional aircraft wings have a structural wing box, formed by front and rear spars joined to upper and lower cover panels. It is this wing box which carries the main operational loads experienced by the wing. Any structures mounted to such wings (e.g. landing gear, engine mounting pylons) are generally attached to the wing box. Moreover, at least some of the space within the wing box may be used as a fuel tank.

It may be desirable to form the wing box, including sealing and testing any fuel tank spaces within the wing box, prior to mounting one or more structures to the wing. For example, this may significantly facilitate the process of sealing and testing the fuel tank spaces.

SUMMARY

A first aspect of the present invention provides a fastener for holding together two or more structures. The fastener comprises a first bush and a second bush. The first bush comprises a hollow shaft having a first end and a second end opposite to the first end. The first end of the shaft of the first bush has a first radially-extending protrusion. The second bush comprises a hollow shaft having a first end and a second end opposite to the first end. The first end of the shaft of the second bush has a second radially-extending protrusion. The second end of the shaft of the second bush is configured to connect to the second end of the shaft of the first bush so as to resist separation of the first and second bushes and so as to define an axial hole through the fastener defined by the shaft of the first bush and the shaft of the second bush. Each of the first and second radially-extending protrusions has an inner surface that is oriented to face one of the structures held together by the fastener. One or both of the inner surface of the first radially-extending protrusion and the inner surface of the second radially-extending protrusion is part-spherical.

Optionally, the or each part-spherical inner surface is configured to abut a spherical washer provided between the or each radially-extending protrusion and structures held together by the fastener.

Optionally, each of the first and second radially-extending protrusions has an outer surface that is oriented to face away from the structures held together by the fastener, and wherein one or both of the outer surface of the first radially-extending protrusion and the outer surface of the second radially-extending protrusion is part-spherical.

Optionally, the axial hole is configured to receive a further fastener. Optionally, the further fastener is configured to resist relatively greater separation loads than the fastener.

Optionally, the fastener is configured to resist separation loads expected to be experienced during manufacture of a component comprising the two or more structures and the further fastener is configured to resist separation loads expected to be experienced during operation of the component comprising the two or more structures.

Optionally, one or more of the first and second radially-extending protrusions comprises a peripheral flange.

Optionally, the fastener is configured to transmit a shear load from a first one of the two or more structures to another one of the two or more structures during operation of a component comprising the two or more structures.

Optionally, one of the second end of the first bush (that is, the second end of the shaft of the first bush) and the second end of the second bush (that is, the second end of the shaft of the second bush) has a smaller external diameter than the other one of the second end of the first bush and the second bush, so that one can be received inside the other one. Optionally, the one of the second end of the first bush and the second end of the second bush that has a larger external diameter has a larger internal diameter than the other one. Optionally, the second end of the second bush and the second end of the first bush are mutually configured to create an interference fit when one is received within the other and separation of the first and second bushes is resisted by friction between the second end of the first bush and the second end of the second bush.

Optionally, the second end of the first bush is configured to interlock with the second end of the second bush to resist axial separation of the first and second bushes.

Optionally, an internal diameter of the hollow shaft of the first bush is substantially equal to an internal diameter of the hollow shaft of the second bush, such that the axial hole has a substantially constant diameter for its full axial length. Optionally, the diameter of the axial hole is configured such that a further fastener intended to be used to hold the one or more structures together during operation of a component comprising the one or more structures is able to be installed through the axial hole.

Optionally, an external diameter of the hollow shaft of the first bush is substantially equal to an external diameter of the hollow shaft of the second bush, so as to create a shaft part of the fastener which has a substantially constant diameter for its full axial length.

A second aspect of the invention provides an assembly comprising a first structure; a second structure; and a fastener extending through the first structure and the second structure. The fastener is configured to resist separation of the first structure and the second structure. The fastener comprises a first part and a second part. The first part has a hollow shaft extending into a hole in a surface of the first structure and a radial protrusion disposed adjacent the surface of the first structure. The second part having a hollow shaft extending into a hole in a surface of the second structure and a radial protrusion adjacent the surface of the second structure. The shaft of the second part is coaxial with the shaft of the first part, and is fixedly connected to the shaft of the first part to resist axial separation of the first part and the second part.

Optionally, each of the first and second parts is a bush.

Optionally, the fastener is configured to transmit a shear load from one of the first and second structures to the other one of first and second structures during operation of a component comprising the first and second structures.

Optionally, the first radially-extending protrusion is provided on a first end of the hollow shaft of the first part and the second radially-extending protrusion is provided on the first end of the hollow shaft of the second part. Optionally, each hollow shaft has a second end opposite to the first end, and the second end of the second part and the second end of the first part are mutually configured to create an interference fit of one inside the other. Optionally, separation of the first and second parts is resisted by friction between the second end of the first part and the second end of the second part.

Optionally, the second end of the first part is interlocked with the second end of the second part to resist axial separation of the first and second parts.

Optionally, an internal diameter of the hollow shaft of the first part is substantially equal to an internal diameter of the hollow shaft of the second part, such that an axial hole defined by the two hollow shafts has a substantially constant diameter for its full axial length.

Optionally, the assembly further comprises an intermediate structure disposed between the first structure and the second structure, and the fastener extends through the first structure, the intermediate structure and the second structure.

Optionally, each of the structures comprises an aircraft structure. Optionally, the first structure is comprised in a fitting for mounting an engine pylon to an aircraft wing and the second structure is comprised in a torsion box of an aircraft wing. Optionally, in examples where the assembly further comprises an intermediate structure, the intermediate structure is comprised in a spar of the aircraft wing and the second structure is comprised in a lower cover of the aircraft wing.

Optionally, the assembly further comprises a further fastener installed through a hole in the fastener defined by the hollow shaft of the first bush and the hollow shaft of the second bush, the further fastener being configured to resist separation of the first and second structures.

Optionally, the fastener is a fastener according to the first aspect.

Optionally, the assembly further comprises a spherical washer between a part-spherical inner surface of the fastener and the first and second structures, arranged such that a flat surface of the spherical washer abuts one of the first and second structures and the spherical surface of the spherical washer abuts the part-spherical inner surface of the fastener A third aspect of the invention provides an aircraft wing comprising the assembly according to the second aspect.

BRIEF DESCRIPTION OF THE DRAWINGS

Embodiments of the invention will now be described, by way of example only, with reference to the accompanying drawings, in which:

FIG. 1b is a schematic top view of the example fastener of FIG. 1a;

DETAILED DESCRIPTION

The examples described below relate to a fastener for holding together two or more structures. Each example fastener comprises a first bush and a second bush. Each of the first bush and the second bush comprises a hollow shaft having a first end and a second end opposite to the first end, wherein the first end of the shaft has a first radially-extending protrusion. The second end of the second bush is configured to connect to the second end of the first bush so as to resist separation of the first and second bushes. When the first and second bushes are so connected, the shaft of the first bush and the shaft of the second bush together define an axial hole through the fastener.

Example fasteners according to the invention confer several advantages. Used alone, they are able to hold two or more structures together in a desired configuration. For example, fasteners according to the invention may be used to hold together components of an aircraft wing box during sealing and testing of a fuel tank space within that wing box. However; by comprising bushes, each example fastener also permits a further fastener to be installed at the same location as the example fastener (i.e. through the axial hole defined by the example fastener), whilst the example fastener according the invention remains in place. Thus, the use of temporary fasteners and/or the requirement for additional fastener locations is avoided.

Such a further fastener may be able to react greater loads than the example fastener, for example the operational loads typically experienced by an aircraft wing box. Such a further fastener may attach one or more additional structures (such as an engine mounting pylon) to the structures joined by the example fastener. After a further fastener has been installed the example fastener may advantageously provide one or more of the additional functions of transmitting shear loads between structures joined by the example fastener, and reducing wear experienced by the further fastener.

A further advantageous effect achievable by at least some example fasteners according to the invention is to reduce or eliminate the need to clamp together two or more structures during the installation of a further fastener (e.g. because the two or more structures are held together by one or more example fasteners according to the invention during a process of installing the further fastener. Clamping can be a difficult and time-consuming process, so eliminating clamping from the joining process can significantly reduce build times.

Figure 1A:
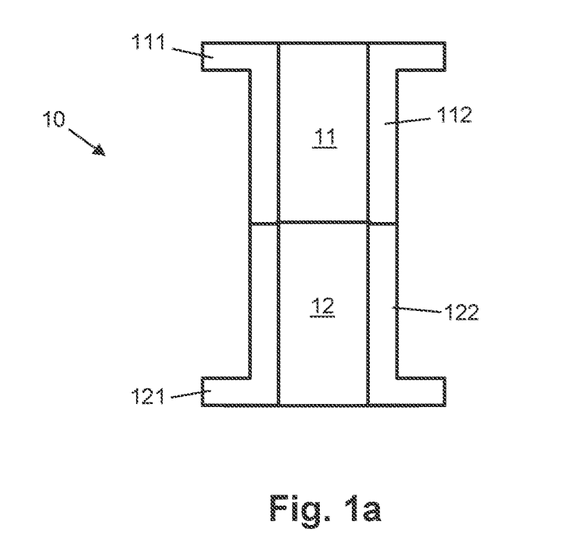
FIG. 1a is a schematic cross-section through an example fastener according to the invention.
Figure 1B:
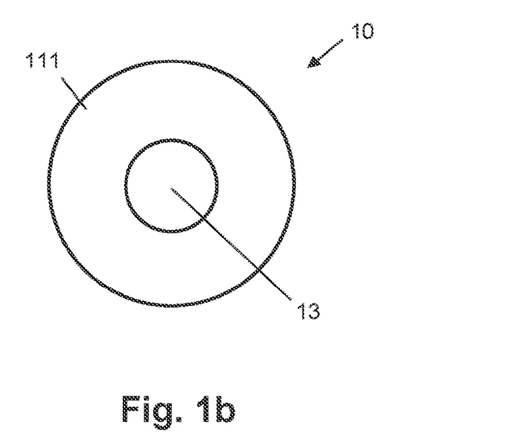

FIGS. 1a and 1b show an example fastener 10 according to the invention. FIG. 1a is a cross-section through the fastener 10 and FIG. 1b is a top view of the fastener 10 (with respect to the orientation shown in FIG. 1a). The fastener 10 comprises a first bush 11 and a second bush 12. The main body of the first bush 11 comprises a hollow shaft 112. A protrusion 111 extends radially outward from the shaft 112 at one end of the shaft 112. An opposite end of the shaft 112 is connected to the second bush 12, as will be described in more detail below. In the illustrated example the protrusion 111 is in the form of a peripheral flange which is present around the entire circumference of the shaft 112. In other examples the protrusion 111 may take other forms. For example, the protrusion 111 may be present on only part of the circumference of the shaft. The protrusion 111 may be one of multiple radially-extending protrusions.

The second bush 12 has a similar configuration to the first bush 11, in that it comprises a hollow shaft 122, one end of which connects to the first bush 11, and an opposite end of which is provided with a radially-extending protrusion 121. In the illustrated example the first bush 11 and the second bush 12 are substantially identical, except for connecting features provided on the connecting ends of the shafts 112, 122. Each bush 11, 12 is formed from a single piece of material (e.g. metal) such that the protrusions 111, 121 are integral with their respective shafts 112, 122. However; this need not be the case in other examples, and any suitable material and construction may be used to form the bushes 11, 12.

In the connected configuration of the first and second bushes 11, 12 shown in FIG. 1a, the shafts 112, 122 are coaxial. The hollow shafts 112, 122 therefore define an axial hole 13 which extends through the fastener 10 in the direction of the long axis of the fastener 10. The axial hole 13 may be configured (e.g. in terms of its diameter, cross-sectional shape, or the like) to receive a further fastener, as will be explained in more detail below. In the particular illustrated example, each of the hollow shafts 112, 122 has a circular cross-section, and the internal diameters of the shafts 112, 122 are substantially equal. As a result, the axial hole 13 has a circular cross-section of a substantially constant diameter for its full axial length.

The first bush 11 and the second bush 12 are connected so as to resist separation of the first and second bushes 11, 12 along the axial direction of the shafts 112, 122. The fastener 10 is thereby able to resist axial separation loads acting to separate structures held together by the fastener. The fastener 10 may be configured to resist separation loads having a particular magnitude, which may correspond for example to a maximum separation load expected to be experienced during manufacture of a component comprising two or more structures held together by the fastener 10. The ability of the fastener 10 to resist separation loads depends, at least in part, on the strength of the connection between the first and second bushes 11, 12.

Any suitable means of connecting the first and second bushes 11, 12 may be provided. Preferably the first and second bushes 11, 12, comprise mating features which form a direct connection between the first and second bushes 11, 12, without the use of a separate connector part. However; fasteners which comprise a separate connector part to form the connection between the first and second bushes 11, 12 are within the scope of the invention. In some examples the first bush 11 is configured to mechanically interlock with the second bush 12. For example, such a mechanical interlock may comprise an interference fit between the first bush 11 and the second bush 12. Alternatively, it may comprise a locking formation on the first bush 11 interacting with a locking formation on the second bush 12, as in the case of a bayonet connection. Any suitable mating features which can interact to form a connection which resists or prevents axial separation of the first and second bushes 11, 12 may be provided on the first and second bushes.

Figure 2:
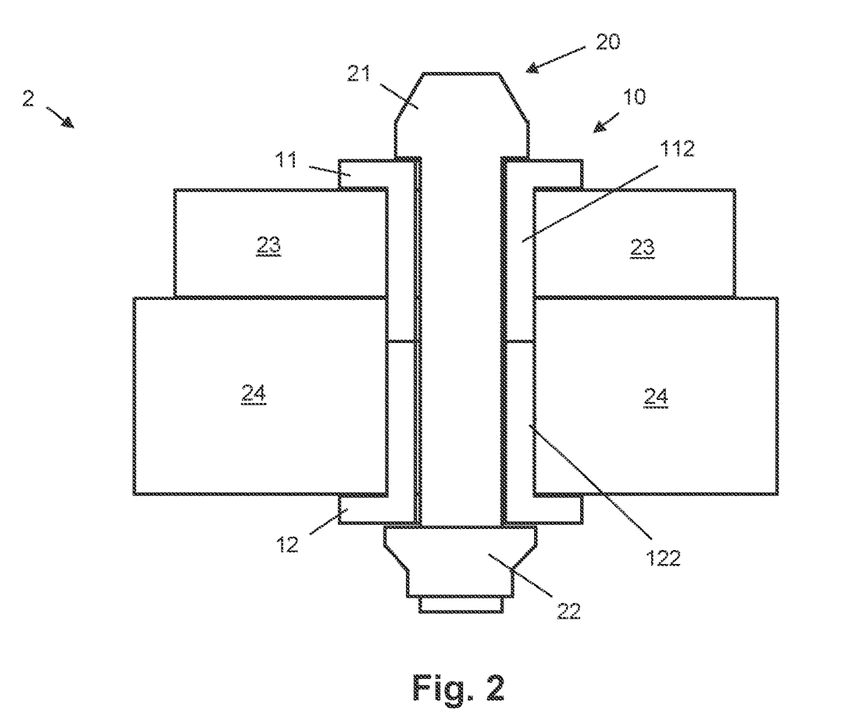
FIG. 2 is a schematic cross-section through an example assembly according to the invention, including an example further fastener.

As mentioned above, the axial hole 13 of the fastener 10 is configured to receive a further fastener. FIG. 2 shows an assembly 2 comprising a first structure 23 and a second structure 24, which are held together by the fastener 10. The first and second structures 23, 24 may be any type of structure. In some examples at least one of the first and second structures 23, 24 is formed from a composite material. In some examples the first and second structures 23, 24 are aircraft components. Although the fastener 10 acts to hold together (i.e. resist or prevent separation of) the first and second structures 23, 24, a further fastener 20 is installed through the axial hole 13 in the fastener 10. The further fastener 20 also acts to hold together (i.e. resist or prevent separation of) the first and second structures 23, 24. The further fastener 20 may be configured to resist relatively greater separation loads (forces) than the fastener 10. The fastener 10 may be configured to resist separation loads up to 50 KN, whilst the further fastener 20 is configured to resist separation loads up to 500 KN.

In some examples the fastener 10 is configured to resist separation loads expected to be experienced during manufacture of a component comprising the first and second structures 23, 24, and the further fastener 20 is configured to resist separation loads expected to be experienced during operation of the component comprising the first and second structures 23, 24. In some examples in which the first and second structures 23, 24 are components of an aircraft wing box, the fastener 10 is configured to resist separation loads experienced during sealing and testing of a fuel tank space within the wing box, and the further fastener 20 is configured to resist separation loads during flight and ground operations of the aircraft.

The further fastener 20 illustrated in FIG. 2 is a nut and bolt fastener comprising a nut 22 and a bolt 21. The shaft of the bolt 21 passes through the axial hole 13 in the fastener 10. The diameter of the bolt shaft is slightly smaller than the diameter of the axial hole 13, to allow easy insertion of the bolt 21 into the hole 13. In some examples the bolt shaft may have a diameter substantially equal to the hole diameter, and/or may require the use of force to insert it into the hole 13. The fastener 10 may be configured so as to create a desired clearance between the hole 13 and the shaft of a given further fastener 20 which is intended to be used with the fastener 10, taking account of manufacturing tolerances. In other examples the further fastener 20 may be any type of fastener suitable for installing through a hole extending through two or more structures and resisting the separation of those two or more structures. For example, the further fastener may be a tension bolt, a rivet, a one-sided fastener, or the like.

Although FIG. 2 shows the assembly 2 as including the further fastener 20, as explained above the fastener 10 is able to hold together the first and second structures 23, 24 (at least against a relatively small separation force) without the addition of the further fastener 20. Therefore, the first and second structures 23, 24 held together only by the fastener 10 would also form an assembly.

Figure 3A:
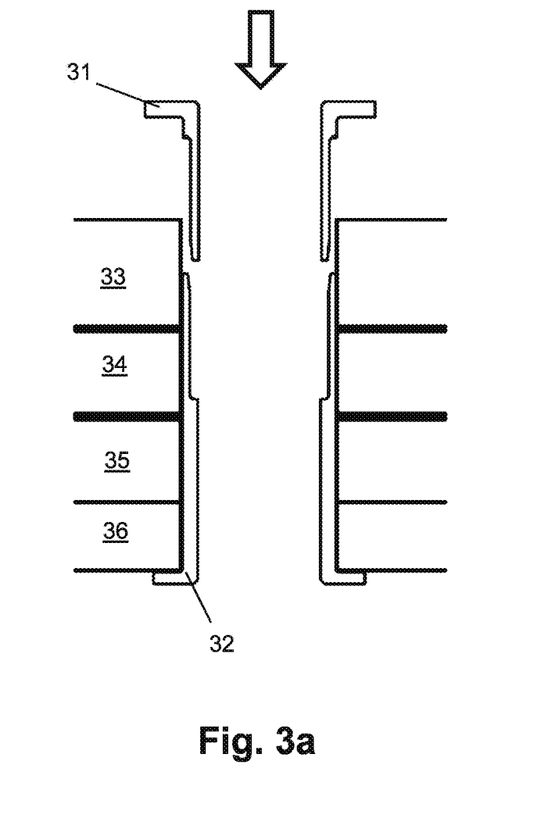
FIGS. 3a and 3b are schematic cross sections through a further example assembly according to the invention, during a process of installing an example fastener according to the invention.
Figure 3B:
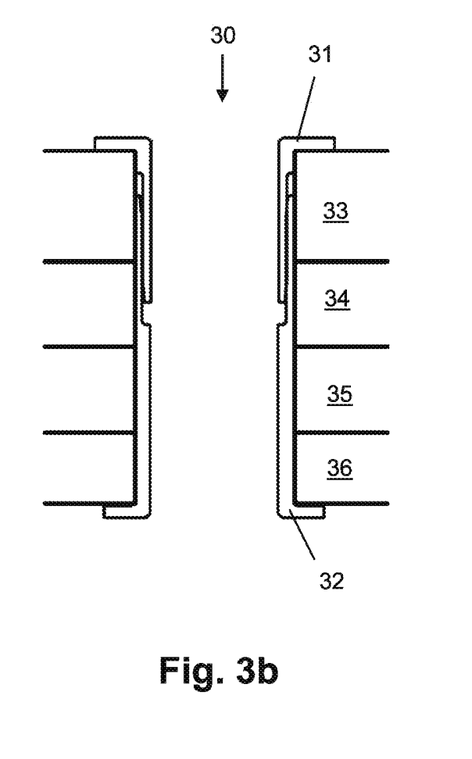

FIGS. 3a and 3b illustrate a particular example of a fastener 30 according to the invention in which first and second bushes 31, 32 of the fastener 30 are connectable via an interference fit. The fastener 30 may have any or all of the same features as the example fastener 10 described above with reference to FIGS. 1a and 1b. FIG. 3a shows the fastener 30 during a process of installing the fastener 30 into a hole extending through four structures 33, 34, 35, 36 which are to be held together by the fastener 30. FIG. 3b shows the assembly formed when the fastener 30 has been installed.

Similar to the first and second bushes 11, 12 shown in FIG. 1a, the first and second bushes 31, 32 of the fastener 30 each comprise a hollow shaft having a radially-extending protrusion at one end (a first end). The opposite (second) ends of the shafts are configured to connect to each other to resist axial separation of the first and second bushes 31, 32. The second end of the first bush 31 has a smaller external diameter than the external diameter of the second end of the second bush 32, and a smaller internal diameter than the internal diameter of the second end of the second bush 32. This enables the second end of the first bush 31 to be received inside the second end of the second bush 32.

In the particular illustrated example, the second end of the first bush 31 has an external diameter which is slightly greater than an internal diameter of the second end of the second bush 32 to create an interference fit between the external surface of the second end of the first bush 31 and the internal surface of the second end of the second bush 32. A connection between the first and second bushes 31, 32 can therefore be formed by forcibly inserting the second end of the first bush 31 into the second end of the second bush 32. When in the connected configuration shown in FIG. 3b, axial separation of the first and second bushes 31, 32 is resisted by friction between the external surface of the second end of the first bush 31 and the internal surface of the second end of the second bush 32.

Insertion of the second end of the first bush 31 into the second end of the second bush 32 may be achieved, for example, using a hydraulic ram. The internal surface of the second end of the second bush 32 and/or the external surface of the second end of the first bush 31 may terminate in a chamfered portion, to facilitate insertion of the second end of the first bush 31 into the second end of the second bush 32.

It can be seen from FIG. 3b that the external diameters and the internal diameters of the first ends of the first and second bushes 31, 32 are substantially equal, and that the relatively reduced external diameter of the second end of the first bush 31 and the relatively increased internal diameter of the second end of the second bush 32 are achieved by reducing the wall thicknesses of the shafts of the first and second bushes 31, 32 at their second ends. As a result, the shaft part of the fastener 30 has a substantially constant external diameter for its full axial length, which may advantageously facilitate its installation into a fastener hole. The shaft part of the fastener 30 also has a substantially constant internal diameter for its full axial length (except for a small discontinuity at the second end of the first fastener 31, the size of which will depend on manufacturing tolerances of the bushes 31, 32 and the structures 33, 34, 35, 36). This may facilitate the installation of a further fastener into the axial hole defined by the hollow shaft part of the fastener 30.

Figure 4:
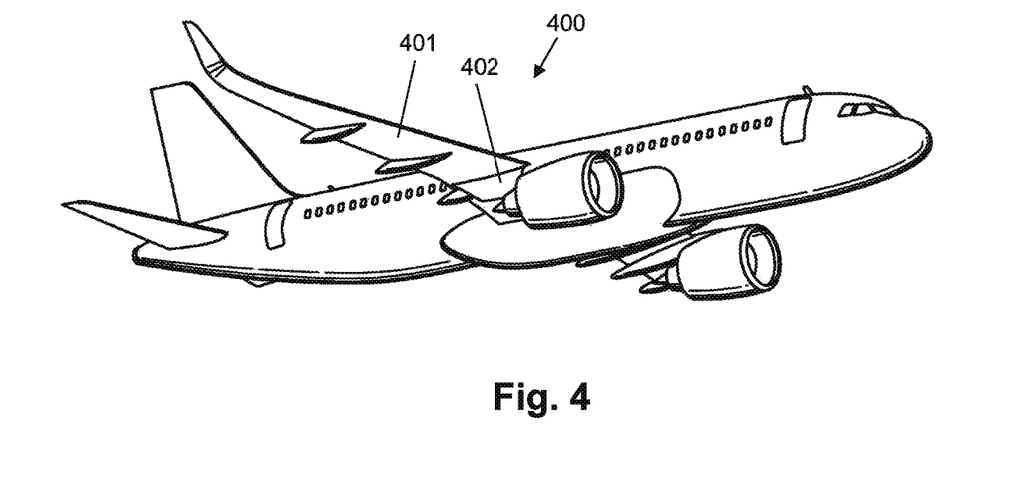
FIG. 4 is a schematic view of an example aircraft comprising an example assembly according to the invention.

Fasteners according to the invention may advantageously be employed in the aerospace industry, e.g. to facilitate aircraft manufacture. FIG. 4 shows an example aircraft 400 which comprises one or more such fasteners. In particular, the aircraft comprises a wing 401, to which an engine mounting pylon 402 is attached. A structure of the engine mounting pylon 402 is attached to a structure of the wing 401 by a plurality of fasteners according to the invention, as will be described below with reference to FIGS. 5a-c. The attached structures and fasteners together form an assembly according to the invention. The aircraft 400 also includes a further wing and engine mounting pylon, which may be attached in the same manner as the wing 401 and pylon 402.

Figure 5A:
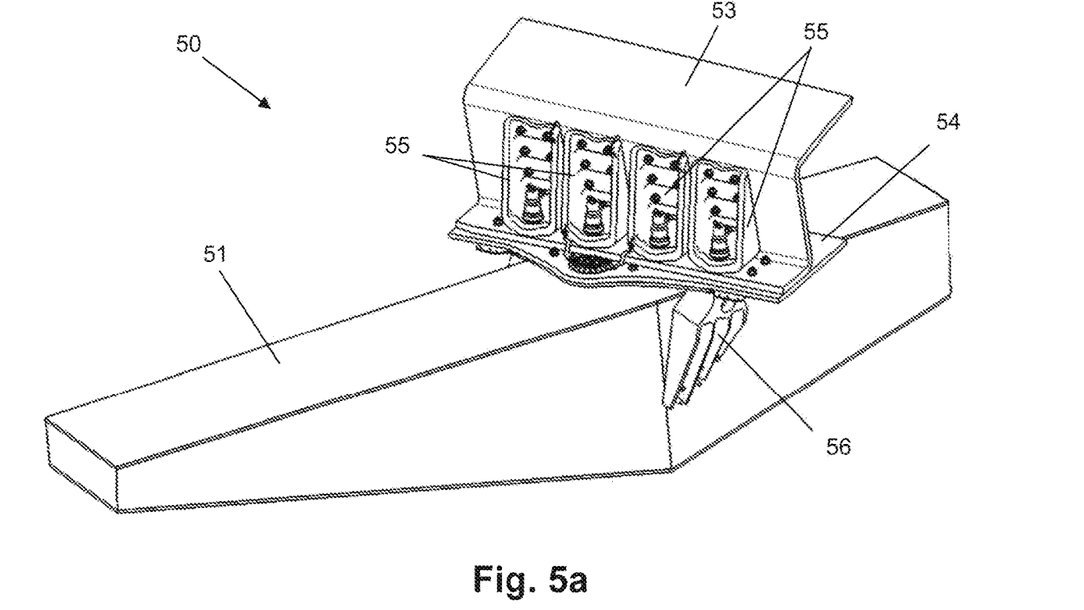
FIGS. 5a and 5b are perspective views of an example assembly comprised in the aircraft of FIG. 4.

FIG. 5a shows an example assembly 50, which may be comprised in the wing 401 of the aircraft 400. The assembly 50 comprises a wing box having a spar 53 and a lower cover 54. In the particular illustrated example, each of the spar 53 and the lower cover 54 is formed from a composite material.

Figure 5B:
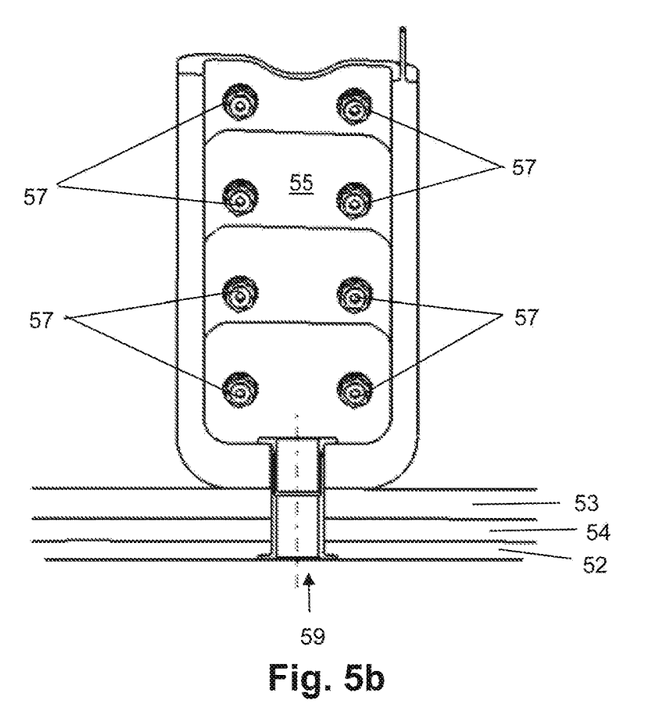
Figure 5C:
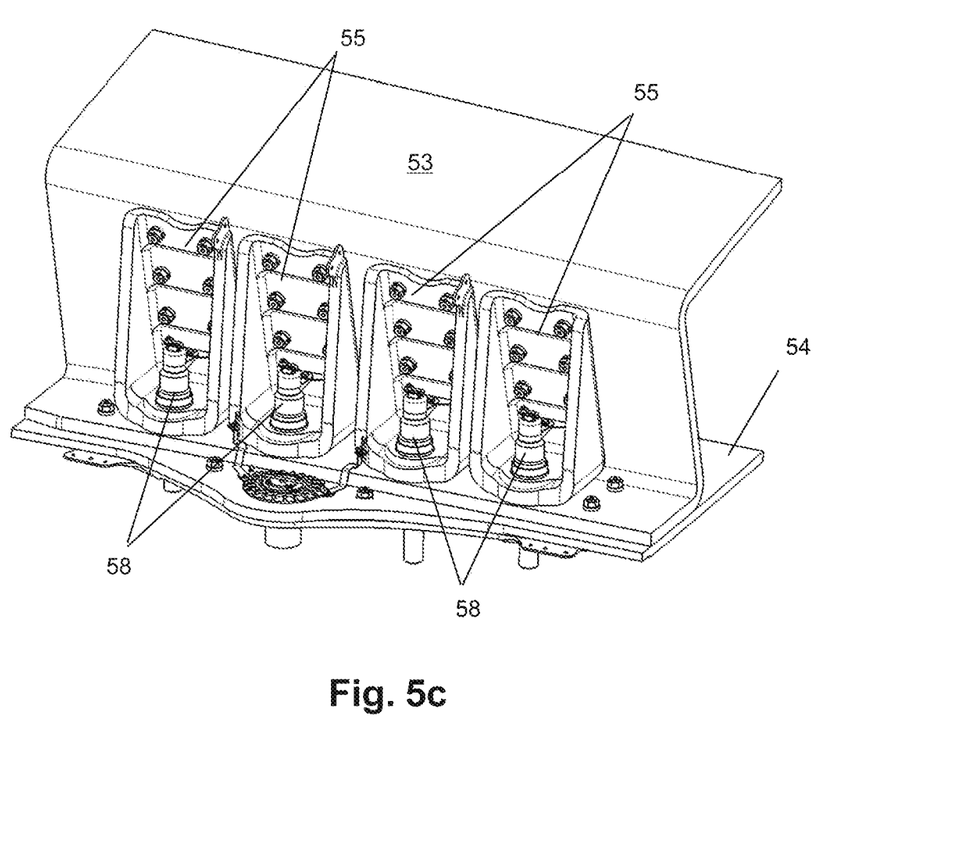
FIG. 5c is a front view of part of the example assembly of FIGS. 5a and 5b.

The assembly 50 further comprises a structure 51 of an engine mounting pylon, which is attached to the wing box using fittings 55 and brackets 56. An interface plate 52 (only visible in FIG. 5b) is provided on a lower surface of the lower cover 54. The interface plate 52 provides an additional load path for transmitting loads from the pylon structure 51 to the wing box, and also acts as a sacrificial pad that can be machined to provide a flat surface for interfacing with the pylon structure 51. FIG. 5b shows part of the assembly 50, in a state before the pylon has been attached to the wing box, and is a close-up front view of one of the fittings 55. FIG. 5c shows the assembly 50 of FIG. 5a with the pylon structure 51 and brackets 56 omitted for clarity. The assembly 50 permits the pylon structure 51 to be attached very close under the lower surface of the wing box (only the interface plate 52 is in between), and therefore facilitates a close-coupled engine arrangement.

It can be seen from FIGS. 5a and 5c that a substantially vertical face of each fitting 55 lies adjacent to and is attached to a substantially vertical face of the spar 53 by a plurality of bolts 57. Each fitting 55 also has a substantially horizontal face which lies adjacent to a substantially horizontal face of the spar 53, to provide a load-bearing attachment structure from which the pylon can be hung. It should be appreciated that the "horizontal" and "vertical" faces of the fittings 55 and the spar 53 are labelled as such merely for ease of reference. The horizontal and vertical faces of the fittings 55 are configured to lie adjacent the corresponding horizontal and vertical faces of the spar 53, which need not be exactly perpendicular to each other, and neither face need be exactly horizontal or vertical with respect to the ground, or any other reference plane.

FIGS. 5a and 5c show the assembly 50 as present in an operational aircraft, in which the pylon structure 51 is attached to the wing box (by means of tension bolts 58). By contrast, FIG. 5b shows just the wing box part of the assembly 50, before the pylon has been attached. It can be seen from FIG. 5b that the wing box structure is held together by a plurality of fasteners 59 according to the invention (only one is shown in FIG. 5b, however; a fastener 59 is provided for each fitting 55). Consequently the tension bolts 58 are not relied on to fix the lower cover 54 to the spar 53. This permits sealing and testing of fuel tank spaces defined by the wing box before the pylon structure 51 is attached. In the illustrated example, each of the fasteners 59 is of the same design as the fastener 30 described above in relation to FIGS. 3a and 3b. However; in principle the fasteners 59 may have any of the features of any of the example fasteners described above.

To attach the pylon structure 51 to the wing box (that is, to form the assembly 50), a tension bolt 58 is installed through the axial hole of each fastener 59. Once the tension bolts 58 have been installed, the function of the fasteners 59 to hold the wing box together is taken over by the tension bolts 58. Consequently, the primary function of the fasteners 59 after the tension bolts 58 have been installed is to act as bushes. During operation of the aircraft in which the assembly 50 is comprised, the fasteners 59 act to transmit shear load between the spar 53 and the lower cover 54 and the interface plate 52 and the lower cover 54. The fasteners 59 therefore provide a first advantageous effect during manufacture of the aircraft, and a second different advantageous effect during operation of the aircraft.

Figure 6:
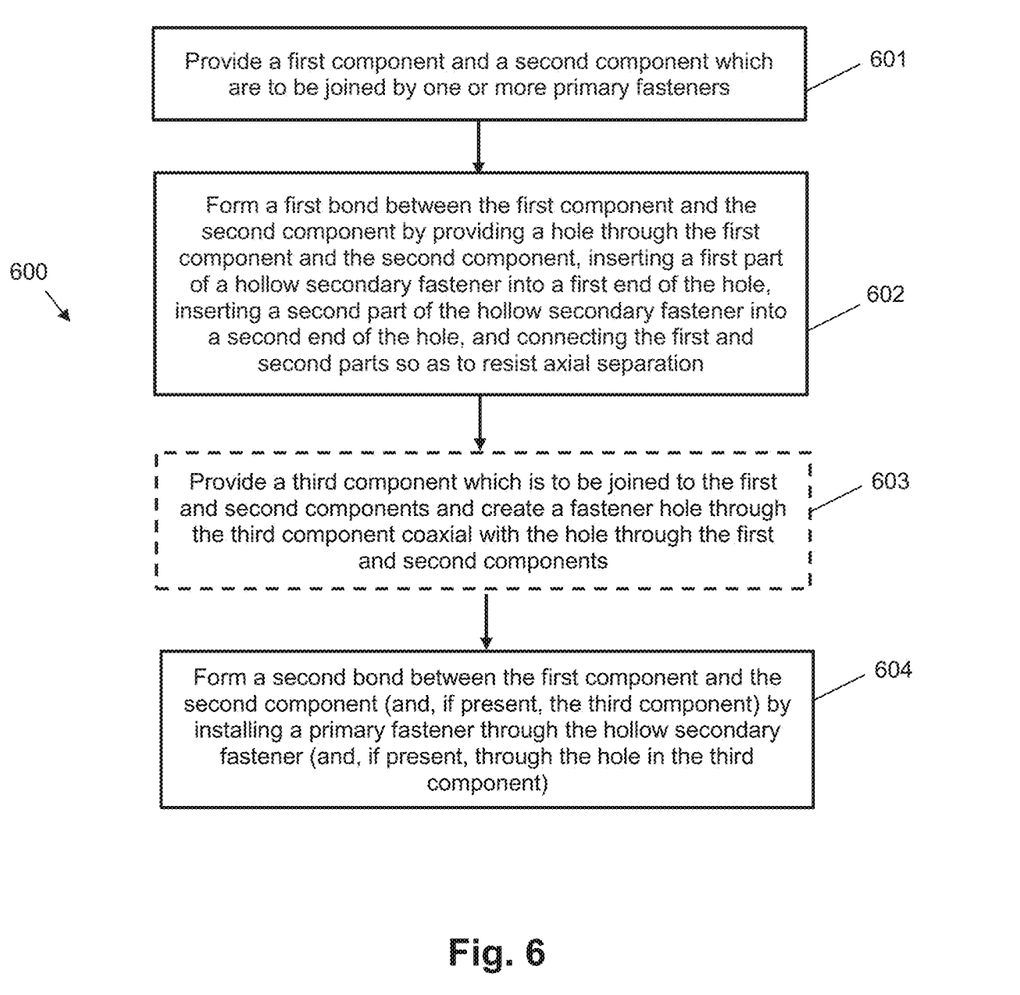
FIG. 6 is a flow chart illustrating an example method of forming an assembly according to the invention.

FIG. 6 is a flow chart illustrating an example method 600 of manufacturing an assembly comprising a fastener according to the invention (such as the example assembly 50 of FIG. 5a).

In a first block 601, a first component and a second component are provided. The first component and the second component are to be joined by one or more primary fasteners, to form an assembly. The primary fasteners may be configured to handle loads expected to be experienced by the assembly during operation of the assembly or of a device (such as an aircraft) in which the assembly is comprised. The primary fasteners may have the features of any of the example further fasteners described above. The first component and the second component may have the features of any of the example first and second components described above. The first and second components may be aircraft components.

In block 602, a first bond is formed between the first component and the second component. The first bond is formed by providing a hole through the first component and the second component, inserting a first part of a hollow secondary fastener into a first end of the hole, inserting a second part of the hollow secondary fastener into a second end of the hole, and connecting the first and second parts so as to resist axial separation. The holes may be provided in any suitable manner, such as drilling. The hollow secondary fastener may have the features of any of the example fasteners according to the invention described above. As such, the first part and second parts may have the features of any of the example first and second bushes described above. Inserting the first and second parts may be performed in any of the manners described above in relation to example first and second bushes. Connecting the first and second parts may be performed in any of the manners described above in relation to the example first and second bushes.

In an optional block 603, a third component is provided. The third component is to be joined to the first and second components. Also in block 603, a fastener hole is created through the third component coaxial with the hole through the first and second components. The third component may, for example, be a component which is desired to be joined to the assembly formed by the first and second components at a later time. In some examples the first and second components may be components of an aircraft wing box, and the third component may be part of an engine mounting pylon. Providing the third component may comprise arranging the third component adjacent to the first and second components in a selected position, e.g. using jigs and/or clamps. The fastener hole may be formed in any suitable manner. The fastener hole may be formed in the same manner as the holes provided in the first and second components in block 602.

In block 604, a second bond is formed between the first component and the second component (and, if present, the third component) by installing a primary fastener through the hollow secondary fastener (and, if present, through the hole in the third component). The primary fastener may be installed in any of the manners described above in relation to example further fasteners. The second bond may be relatively stronger than the first bond.

It may be intended to join the first and second components by multiple primary fasteners. In such cases the method 600 may be performed in respect of each of the multiple secondary and primary fasteners. The method 600 may be performed sequentially, simultaneously, or a combination of both sequentially and simultaneously, until all primary fasteners intended to be used to join the first and second components have been installed.

The example fasteners described above have radially-extending protrusions with flat inner surfaces (the inner surfaces being the surfaces which face the structures held together by the fastener when the fastener is in use). Such designs permit the fasteners to be as light as possible, and are therefore advantageous for applications where minimizing weight is a primary concern. However; to ensure correct seating of the fastener (correct seating requires the full area of each inner surface of a radially-extending protrusion to be in contact with the adjacent structure), it is often necessary to spot-face the surface of one of the structures held together by the fastener, in the region that will contact one of the inner surfaces. Determining whether spot-facing is needed for a given fastener, and carrying out the spot-facing, are skilled manual procedures that can add significantly to the time required to install a fastener.

Figure 7:
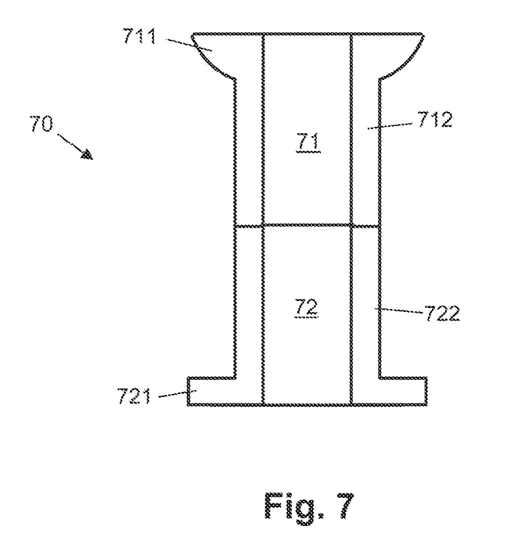
FIG. 7 is a schematic cross-section through a further example fastener according to the invention.
Figure 8:
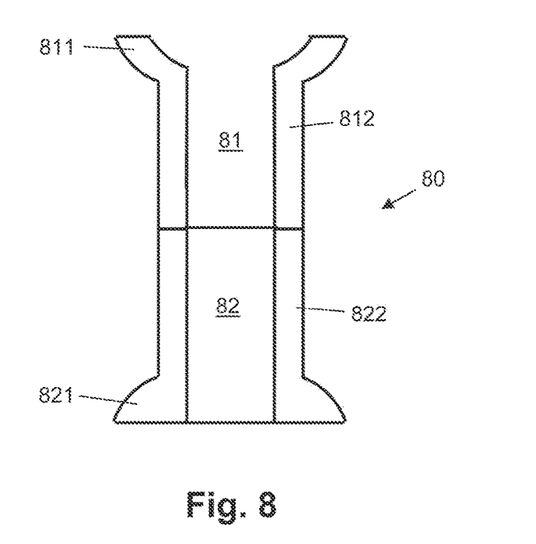
FIG. 8 is a schematic cross-section through a yet further example fastener according to the invention.
Figure 9:
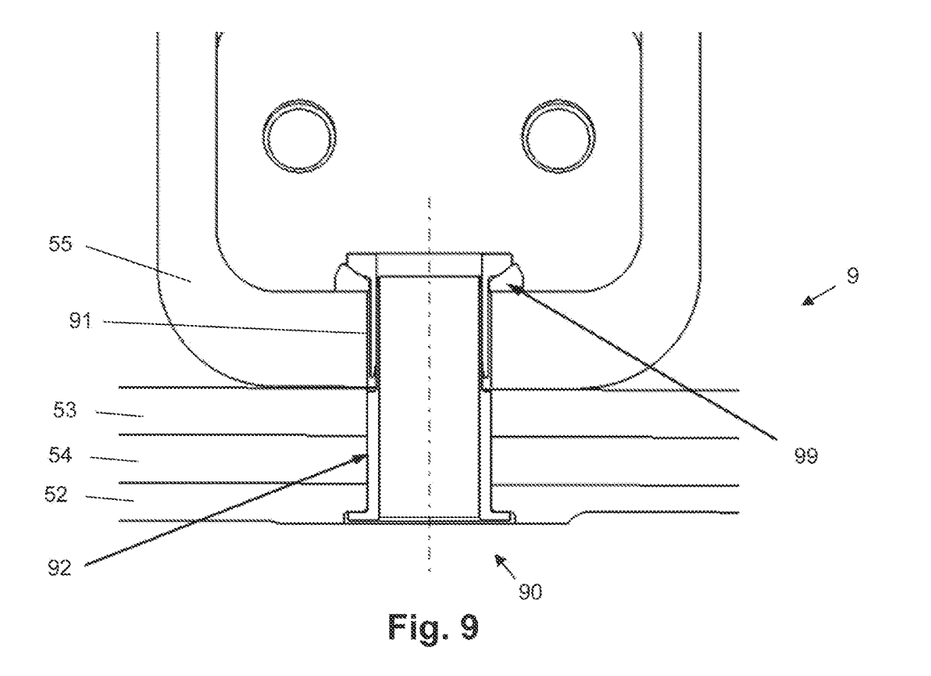
FIG. 9 is a schematic cross-section through a further example assembly according to the invention.

FIGS. 7 to 9 illustrate alternative example fasteners according to the invention, which are configured to ensure that spot-facing is never required in order for the fastener to be correctly seated. The example fasteners of FIGS. 7 to 9 are therefore particularly suitable for applications where speed of installation is a primary concern, and will be referred to as "high-rate" fasteners.

FIG. 7 is a cross-section through a first example high-rate fastener 70 according to the invention. The example high-rate fastener 70 comprises a first bush 71 and a second bush 72. The second bush 72 is identical to the second bush 12 of the example fastener 10 shown in FIGS. 1*a-b*. For example, the first bush 71 includes a first shaft 712, and the second bush 72 includes a shaft 722 and a protrusion 721. The first bush 71 is the same as the first bush 11 of the example fastener 10, except for the configuration of the protrusion 711. Unlike the protrusion 111 of the example fastener 10, which has a flat inner surface, the inner surface of the protrusion 711 is part-spherical. The radius of the part-spherical surface may be selected in dependence on the particular application. The inner-surface of the protrusion 711 may be configured to match a corresponding part-spherical surface on a spherical washer. In the illustrated example, the inner surface of the protrusion 711 is convex, and is configured to abut a concave spherical washer, although this arrangement could be reversed in other examples. In use of the fastener 70 such a spherical washer may be provided between the protrusion 711 and the structures held together by the fastener 70.

The spherical shape of the contact surfaces means that these surfaces will be in contact with each other across the full area of the inner surface of the protrusion 711 even if the stem of the fastener is not exactly perpendicular to the surface of the adjacent structure. (which may often be the case, for example due to tolerances in the manufacture of the structures and the creation of the fastener hole). For most applications, it is sufficient to provide a spherical surface on only one bush of the fastener. The end of the fastener hole that is created first during a drilling process is generally perpendicular to the surrounding surface, so correct seating of the bush that is adjacent this end of the hole is achieved even with a flat inner surface on the protrusion. For a fastener having one spherical surface, such as the example fastener 70, the bush comprising the part-spherical surface should be installed adjacent the end of the fastener hole opposite to the end from which drilling of the hole was started.

FIG. 8 is a cross-section through a further example high-rate fastener 80 according to the invention. In this example, both a first bush 81 and a second bush 82 of the fastener 80 have shafts 812, 822 with protrusions 811, 821 with part-spherical inner surfaces. The protrusion 821 on the second bush 82 has the same configuration as the protrusion 711 on the first bush 71 of the example high-rate fastener 70—that is, it has a flat outer surface and a part-spherical inner surface. However, the protrusion 811 on the first bush 81 is differently configured. In particular, both the inner and outer surfaces of the protrusion 811 comprise a part-spherical surface. The radius of curvature of the inner and outer part-spherical surfaces need not be the same. Providing a part-spherical outer surface on the protrusion 811 may advantageously facilitate correct seating of a further fastener that is to be installed through the fastener 80, in the manner described above in relation to FIG. 2. A further fastener configured to be installed through the fastener 80 would comprise a spherical surface configured to abut the part-spherical outer surface of the protrusion 811 after installation of the further fastener.

FIG. 9 is a cross-section through part of an example assembly 9. The assembly 9 comprises a set of structures 52-54 held together by an example high-rate fastener 90. The high-rate fastener 90 comprises a first bush 91 and a second bush 92 and is of the same general type as the high-rate fastener 70 described above. The structures 52 to 54 are the same structures comprised in the example assembly 50 described above in relation to FIGS. 5a-c. The assembly 9 further comprises a spherical washer 99. The spherical washer 99 is provided between the part-spherical inner surface of the first bush 91 of the fastener 90, and the upper surface of the structure 54. The spherical washer 99 has a flat lower surface, which abuts the structure 54, and a part-spherical upper surface, which abuts the part-spherical inner surface of the first bush 91 of the fastener 90. The part-spherical surface of the washer 99 is configured to match the part-spherical surface of the first bush 91. In particular, the radius of curvature of the part-spherical washer surface is the same as the radius of curvature of the part-spherical bush surface. The assembly 9 may be formed in substantially the same manner as the example assembly 50, except that the washer 99 must be provided on the structure 54 before the first bush 91 is inserted into the fastener hole. The method 600 of FIG. 6 may be used to form the assembly 9.

Although the invention has been described above with reference to one or more preferred examples or embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of structures for an aerospace device, the assembly comprising:
 a first structure of the aerospace device;
 a second structure of the aerospace device, wherein the second structure is separable from the first structure; and
 a hollow fastener extending through the first structure and the second structure and configured to resist separation of the first structure and the second structure;
 wherein the hollow fastener comprises:
  a first part including:
   a hollow shaft extending into a hole in a surface of the first structure, and
   a first radial protrusion having a first surface disposed adjacent the surface of the first structure;
  a second part including:
   a hollow shaft extending into a hole in a surface of the second structure, and
   a second radial protrusion having a second surface facing the first surface, wherein the second surface is adjacent the surface of the second structure;
 wherein the hollow shaft of the second part is coaxial with the hollow shaft of the first part, and is connected to the hollow shaft of the first part to resist axial separation of the first part and the second part, and
 wherein an internal diameter of the hollow shaft of the first part is equal to an internal diameter of the hollow shaft of the second part, such that an axial hole defined by the hollow shafts has a constant diameter for a full axial length of the first and second hollow shafts.

2. The assembly according to claim 1, wherein the hollow fastener is configured to transmit a shear load from one of the first and second structures to the other one of first and second structures during operation of a component comprising the first and second structures.

3. The assembly according to claim 1, wherein the first radial protrusion is provided on a first end of the hollow shaft of the first part and the second radial protrusion is provided on the first end of the hollow shaft of the second part, wherein each hollow shaft has a second end opposite to the first end, and wherein the second end of the second part and the second end of the first part are mutually configured to create an interference fit of one inside the other, and wherein separation of the first and second parts is resisted by friction between the second end of the first part and the second end of the second part.

4. The assembly according to claim 3, wherein the second end of the first part is interlocked with the second end of the second part to resist axial separation of the first and second parts.

5. The assembly according to claim 1, further comprising an intermediate structure disposed between the first structure and the second structure, wherein the hollow fastener extends through the first structure, the intermediate structure and the second structure.

6. The assembly according to claim 5, wherein the intermediate structure is comprised in a spar of an aircraft wing, and the second structure is comprised in a lower cover of the aircraft wing.

7. The assembly according to claim 1, wherein each of the first and second structures comprises an aircraft structure.

8. The assembly according to claim 7, wherein the first structure is comprised in a fitting for mounting an engine pylon to an aircraft wing, and the second structure is comprised in a torsion box of an aircraft wing.

9. The assembly according to claim 1, further comprising a further fastener installed through a hole in the hollow fastener defined by the hollow shaft of the first part and the hollow shaft of the second part, the further fastener being configured to resist separation of the first and second structures, wherein the further fastener is configured to resist relatively greater axial separation loads than the hollow fastener.

10. The assembly according to claim 1, further comprising a spherical washer between a part-spherical inner surface of the fastener and the first structure and the second structure, arranged such that a flat surface of the spherical washer abuts one of the first and second structures and the spherical surface of the spherical washer abuts the part-spherical inner surface of the fastener.

11. The assembly according to claim 1, wherein at least one of the first surface on the first radial protrusion ad the second surface on the second radial protrusion is at least partially spherical.

12. An aircraft wing comprising the assembly according to claim 1.

13. A method for assembling aerospace structures comprising:
bringing together a first and a second aerospace structure such that a first hole in the first aerospace structure aligns with a second hole in the second aerospace structure, wherein the first and second aerospace structures are separable;
inserting a first hollow shaft of a first part of a hollow fastener through the first hole such that a radial portion of the first part has a first surface abutting a surface of the first aerospace structure;
inserting a second hollow shaft of a second part of the hollow fastener through the second hole such that a radial portion of the section part has a second surface facing the first surface and abutting a surface of the second aerospace structure, wherein the first and second hollow shafts are coaxial and an internal diameter of the first hollow shaft is equal to an internal diameter of the second hollow shaft such that the internal diameters of the first and second hollow shafts are constant for a full axial length of the first and second hollow shafts;
coupling the first hollow shaft of the first part to the second hollow shaft of the second part while inserted in the first and second aerospace structures, respectively, to resist separation of the first structure and the second structure during assembly of the first and second aerospace structures;
inserting a shaft of a bolt into the first and second hollow shafts and attaching a nut to an end of the shaft of the bolt to secure the first and second aerospace structures during operation of the aerospace structures in flight.

* * * * *